March 1, 1960 — K. GEBELE — 2,926,584
PHOTOGRAPHIC CAMERA AND SHUTTER CONSTRUCTION
Filed Feb. 16, 1954 — 2 Sheets-Sheet 1

INVENTOR
KURT GEBELE
BY Charles Shepard
ATTORNEY

March 1, 1960  K. GEBELE  2,926,584
PHOTOGRAPHIC CAMERA AND SHUTTER CONSTRUCTION
Filed Feb. 16, 1954  2 Sheets-Sheet 2

INVENTOR
KURT GEBELE
BY Charles Shepard
ATTORNEY

United States Patent Office

2,926,584
Patented Mar. 1, 1960

2,926,584

PHOTOGRAPHIC CAMERA AND SHUTTER CONSTRUCTION

Kurt Gebele, Munich, Germany, assignor, by mesne assignments, to Compur-Werk Friedrich Deckel OHG., Munich, Germany, a German firm Application February 16, 1954, Serial No. 410,565

Claims priority, application Germany February 25, 1953

5 Claims. (Cl. 95—64)

This invention relates to a photographic camera, and particularly to the shutter and associated parts.

An object of the invention is the provision of generally improved and more satisfactory setting and indicating means for setting the shutter speed or time, for setting the diaphragm aperture, and for indicating the results of such setting.

Another object is the provision of mechanism particularly but not exclusively adapted to setting the shutter speed and diaphragm aperture in a camera of the twin lens reflex type.

Still another object is the provision of convenient and simple mechanism whereby, in a camera of the twin lens reflex type, the shutter speed and the diaphragm aperture may be adjusted relative to each other to effect a relationship between them which may be called the total exposure value or integrated exposure value, after which either the shutter speed or the diaphragm aperture may be further adjusted as desired, in a manner to cause an automatic compensating or complementary adjustment of the other, without varying the total exposure value relationship existing between the shutter speed adjustment and the diaphragm aperture adjustment, unless it is purposely desired to alter such relationship.

A further object is the provision of simplified and satisfactory means for conveniently observing the integrated exposure value relationship to which the parts have been set, as well as observing the particular shutter speed setting and diaphragm aperture setting existing at any moment.

These and other desirable objects may be attained in the manner disclosed as an illustrative embodiment of the invention in the following description and in the accompanying drawings forming a part hereof, in which.

The same reference numerals throughout the several views indicate the same parts.

Figure 1:
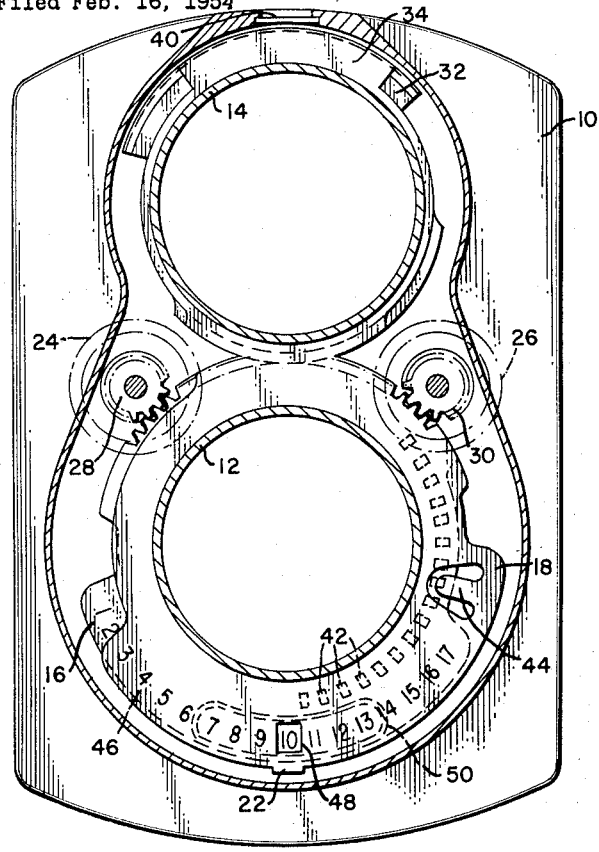
Fig. 1 is a front face view, with certain parts omitted and certain parts in vertical section, of a camera front structure for a twin lens reflex type of camera, showing the present invention applied thereto.
Figure 2:
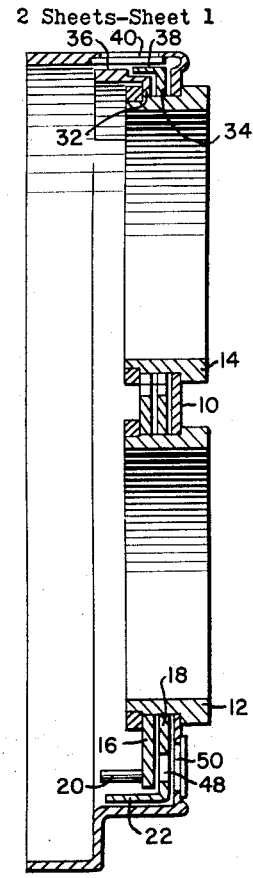
Fig. 2 is a vertical section taken along the optical axis of the front structure, the lenses and the shutter itself being omitted but the parts for adjusting the shutter speed and the diaphragm aperture being shown.

This construction may be considered as a modification or improvement of the construction disclosed in the United States patent application of Kurt Gebele, Serial No. 389,775, filed November 2, 1953 (now Patent 2,829,574, granted April 8, 1958), for Photographic Shutter, and the disclosure of the present application presupposes familiarity with the disclosure of said prior application. Said prior application fully discloses the manner in which the shutter itself and the diaphragm or stop may be constructed, together with certain forms of coupling means for coupling the shutter speed adjusting parts to the diaphragm aperture adjusting parts, and indicating means for indicating the relationship of these parts to each other as well as the absolute values of the shutter speed setting and the diaphragm aperture setting. As distinguished from the constructions disclosed in said prior application, the present invention carries the basic idea further along and provides a construction especially but not exclusively adapted to a photographic camera of the twin lens reflex type, and especially to that type of construction in which the shutter itself is enclosed within a casing on the front structure of the camera and in which the time adjustments and aperture adjustments are effected by rotatable knobs projecting forwardly from the front structure, as for example in the well known twin lens reflex camera manufactured under the trademark Rolleiflex by the firm of Franke & Heidecke, of Braunschweig, Germany, the main constructional features of such camera being known in the art and also being disclosed in the book "Rollei Photography; Handbook of the Rolleiflex and Rolleicord Cameras," by Jacob Deschin, published in 1952 by Camera Craft Publishing Company, of San Francisco, Calif.

Referring now to the construction shown in Figs. 1–4 of the drawings, the usual front structure of the above mentioned Rolleiflex camera is indicated in general at 10, and includes a lower lens tube 12 for the picture taking or photographic lens, and an upper lens tube 14 for the view finder lens. The usual photographic shutter of the objective type is associated with the lower lens tube 12; in fact, the lens tube 12 may actually be the forward lens tube constituting part of the shutter. The shutter itself is not illustrated in the present drawings, but may be constructed (as mentioned in said prior application No. 389,775) substantially in the manner disclosed in U.S. Patent 1,687,123, granted October 9, 1928 for an invention of Deckel and Geiger.

Two setting rings or disks 16 and 18 are rotatable circumferentially on the lower lens tube 12, about the optical axis of the lens tube and shutter as a center of rotation. The rear setting ring 16 is coupled by any suitable means, such as by the pin 20, to the shutter speed control ring or setting ring of the shutter, such as the speed adjustment ring 63 of said Deckel and Geiger patent. The front ring 18 is coupled by any suitable means, such as the ear or lug 22, to the iris diaphragm adjusting member of the shutter, such member being shown in Figs. 1 and 13 of the drawings of said Deckel and Geiger patent, but having no reference numeral therein. As explained in said prior application No. 389,775, the shutter is modified to the extent that the relative rotary motions of the shutter speed adjusting ring and the diaphragm or stop adjusting member are reversed from the relationship shown in said Deckel and Geiger patent, so that when the speed adjusting ring and the diaphragm adjusting member both turn in the same direction to the same angular extent, the parts will be adjusted in a complementary or compensating manner; that is, if the shutter speed is made slower, with a longer time of exposure, the diaphragm aperture will be decreased to an extent sufficient to compensate for the longer exposure, and when the shutter speed is made faster, with a shorter time of exposure, the diaphragm aperture will be increased to compensate for the shorter time of exposure, assuming that illumination conditions remain constant.

These rings 16 and 18 are turned on the lens tube 12, to adjust the shutter speed and aperture, by means of the familiar knobs 24 and 26 well known in Rolleiflex cameras, projecting from the front of the casing. The respective shafts of the two knobs are provided with pinions 28 and 30 which mesh respectively with peripheral gear teeth on the respective rings 16 and 18.

Figure 3:
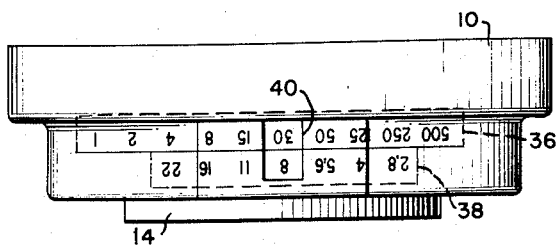
Fig. 3 is a top plan view of the construction shown in Figs. 1 and 2.
Figure 4:
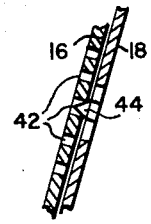
Fig. 4 is a fragmentary section showing details of the resilient coupling between the diaphragm aperture setting member and the shutter speed setting member.

The indicating rings 32 and 34 turn circumferentially on the upper lens tube 14, and are located respectively in the transverse planes of the rings 16 and 18. Gear teeth on the ring 32 mesh with gear teeth on the ring 16, so that both rings turn together. Likewise gear teeth on the ring 34 mesh with gear teeth on the ring 18, so that they both turn together. The indicating rings are respectively equipped with peripheral flanges 36 and 38, the former carrying the exposure time or shutter speed scale, while the latter carries the diaphragm aperture or stop scale, both scales being simultaneously visible from above through a window 40 located centrally over the lens tube 14, as seen in Fig. 3. In this figure, the scales on the flanges 36 and 38 are shown in straight line projection, for the sake of greater clarity.

The rings 16, 18, 32, and 34, together with the interconnection of the rings with each other, the graduated scales 36 and 38 visible through the observation window 40, and the adjusting knobs 28 and 30, are of the familiar construction well known in cameras of the kind above mentioned, except for the altered features mentioned below. According to the present invention, a resilient coupling is provided between the rings 16 and 18, so that when one ring is turned, the other will turn with it unless enough force is used to disconnect or alter the resilient coupling. The coupling between the rings 16 and 18 is a new feature constituting part of the present invention, and not found in the known cameras above mentioned.

In the preferred form of construction, the coupling between the rings 16 and 18 is effected by providing an arcuate series of holes or depressions 42 in the front face of the ring 16, to be selectively engaged by a flexible pawl 44 projecting from the rear face of the ring 18. As will be readily apparent from Figs. 1 to 4, this provides an elastic or resilient coupling. The pawl 44 has sufficient rigidity so that when it is engaged in one of the depressions 42, the parts are coupled to each other with sufficient strength to overcome ordinary frictional forces, and when either one of the two rings 16 and 18 is turned, the other will turn with it. But if one ring is held stationary (as for example by holding its respective knob 28 or 30 against turning) and the other ring is forcibly turned, then the resilient pawl 44 is forced out of the particular depression or notch 42 in which it happens to be seated and it ratchets over one or more of the depressions or notches, so long as the displacing force continues to be applied, until it comes to rest in the desired notch.

The relationship of the two disks 16 and 18 to each other thus determines what may be called the integrated exposure value or total light value, as more fully explained in said prior application No. 389,775. This total exposure value or relationship is independent of the absolute values of either shutter speed or diaphragm aperture, but taken into account their relative values with reference to each other, as well as other factors which it may be desired to recognize, such as film speed rating, or filter factor.

To enable the user of the camera to determine the integrated exposure value for which the parts happen to be set at any given time, a graduated scale 46 (Fig. 1) is carried by the front face of the rear ring 16, graduated for example in consecutive numbers from 1 to 17, in the particular form here shown. Any particular one of these values may be observed through the small window 48 formed through the front ring 18, this window in turn being observed through a longer arcuate window 50 in the front wall of the housing or front structure 10.

The operation of this form of the invention is as follows: When a picture is to be taken, the total light value or integrated exposure value is determined in any suitable way, such as by means of an exposure meter, making due allowance for filter factor, if any, and for the film speed of the particular film being used in the camera. Let it be assumed that the integrated exposure value is determined by "10." Then the coupling between the disks or rings 16 and 18 is adjusted so that the numeral 10 of the scale 46 appears through the window 48. This is done by holding either one of the knobs 28 or 30 stationary, meanwhile forcibly turning the other one of these knobs so that one of the rings is held stationary while the other is turned, sliding the spring tooth or elastic pawl 44 forcibly over the notches or recesses 42 until it comes to the proper recess where the numeral 10 appears through the window 48.

With the parts set in this way, the operator has now achieved the desired relationship or ratio between shutter speed and diaphragm aperture, in order to make a proper exposure under the particular light conditions present, and without regard to absolute values of either shutter speed or diaphragm aperture. He now has a choice as to shutter speed or aperture, while maintaining the same ratio between them. By turning either one of the knobs 28 and 30, he can now simultaneously turn both of the adjusting rings 16 and 18, to vary the shutter speed, whereupon the aperture will be automatically varied in a complementary manner, or to vary the aperture, whereupon the shutter speed will be varied in a complementary manner. The absolute values of speed and aperture at any particular moment of adjustment can be read through the window 40 at the top of the mechanism, as seen for example in Fig. 3.

If, for instance, the shutter speed is set at 30, meaning an exposure of $\frac{1}{30}$ of a second, the diaphragm aperture will be at 8 (meaning $f/8$) in the example shown in Fig. 3. But without altering the total exposure value of 10 appearing through the window 48, the operator can turn the ring 16 to adjust the shutter speed to the faster value of 50, the other ring 18 simultaneously turning with it (due to the elastic coupling 42, 44) to increase the aperture from $f/8$ to $f/5.6$, to compensate for the faster speed. Or again, while maintaining the same integrated exposure value of 10, the operator can decrease the shutter speed (increasing the duration of exposure) to $\frac{1}{15}$ of a second, simultaneously decreasing the aperture to $f/11$. Other combinations are possible, the above being given by way of example only.

When these adjustments are made, the same numeral of the scale 46 continues to show through the window 48, although the window 48 itself may move in one direction or the other along the arcuate window 50. The length of the arcuate window 50 is such that the window 48 will still be visible through the window 50 in all possible positions to which the ring 18 may be set for practical operation. If the window 48 vanishes from view at one end or the other of the window 50, the operator will know that the acceptable limits of adjustment have been exceeded, and appropriate change in the adjustment is necessary.

Figure 5:
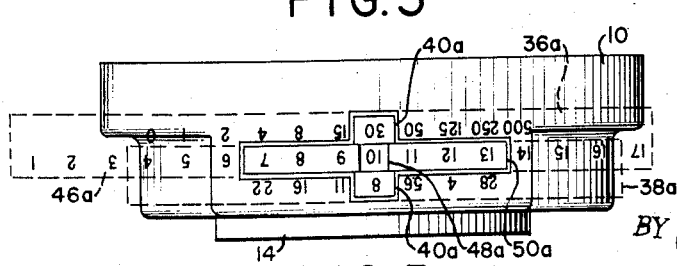
Fig. 5 is a view similar to Fig. 3 showing a modified construction.
Figure 6:
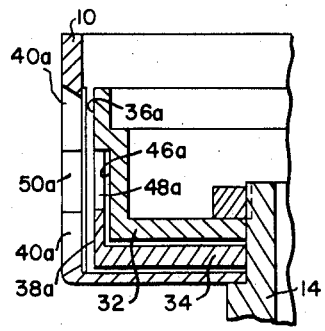
Fig. 6 is a section taken substantially on the line 6—6 of Fig. 5, on an enlarged scale.

If it is found inconvenient to observe the shutter speed and diaphragm aperture settings from a window at the top of the casing and to observe the integrated exposure value scale from a separate window on the front, all of the scales can be observed from a single window at the top, if desired. An example of such an arrangement is shown in Figs. 5 and 6, wherein corresponding parts which are not changed bear the same reference numerals as in Figs. 1–4, and parts which are modified bear the same reference numerals with the addition of the letter $a$ to each numeral. The lens tube 14 and the rings 32 and 34 which rotate thereon are the same as before. But the flanges 36 and 38 which carry the graduations are made somewhat differently as indicated at 36a and 38a, so that the portion 36a carrying the speed scale is offset axially from the diaphragm aperture scale 38a, instead of being directly next to it as in Fig. 3. Another portion 46a of the speed scale ring 32 carries the total exposure value graduations, read through a small window 48a in a flange formed on the aperture indicator ring 34. The exposure value scale graduations 46a are thus interposed between the speed scale graduations 36a and the diaphragm stop graduations 38a, which are read through the window 40a elongated in an axial direction. The window 50a elongated in a circumferential direction overlies the window 48a and the integrated exposure value scale 46a, as seen in Fig. 5. Thus the integrated exposure value is read through the window 48a, which may be at the center of the window 50a as seen in Fig. 5 or may move one way or the other circumferentially along the window 50a, while the absolute values of shutter speed and diaphragm aperture are read through the forward and rear notches of the window 40a.

Figure 7:
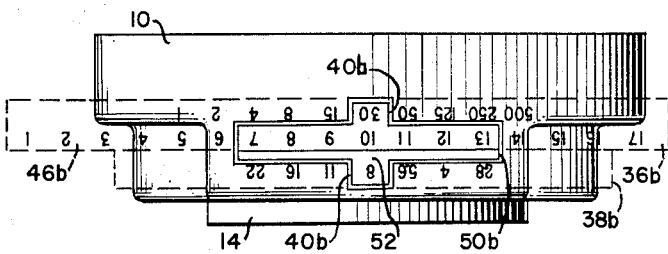
Fig. 7 is a view similar to Figs. 3 and 5, showing another modification.

Still another form of construction in which the graduations are all arranged together instead of in separate locations, is shown in Fig. 7, in which the same reference numerals as before have been used, with the addition of the letter b to each numeral representing a part which has been modified as compared with Figs. 1-4, and the same numerals unchanged for those parts which have not been modified. The window 40b with its forward and rear notches serves to read the diaphragm aperture scale 38b and the shutter speed scale 36b, respectively. The integrated exposure value scale 46b in this instance is placed along side of and slightly in front of the shutter speed scale 36b, and is read through the window 50b by means of an index mark 52 placed on the diaphragm aperture scale 38b. The separate window 48 or 48a is entirely eliminated in this construction, the total exposure value being read by observing that one of the exposure value scale numbers which comes opposite the index mark 52.

In Figs. 5 and 7, the various scales are shown in straight line projection, for greater clarity, just as was the case in Fig. 3.

Figure 8:
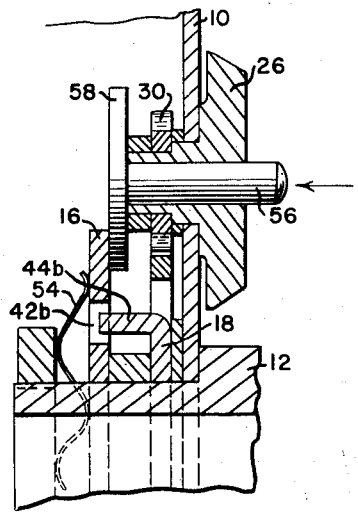
Fig. 8 is a radial section taken axially along the optical axis of the shutter and the axis of rotation of one of the setting knobs, showing details of a modified form of construction.

The coupling between the ring 16 and the ring 18 can take various forms in addition to the specific form illustrated in Figs. 1-4. For example, another form of construction is shown in Fig. 8, in which the rings 16 and 18 rotate as before on the lens tube 12, but the speed setting ring 16 in this instance is given some freedom of axial movement, being resiliently pressed forwardly by a corrugated spring ring 54 which lies between the rear face of the ring 16 and the front face of the stationary collar. The ring 16 is provided with an arcuate series of notches, recesses, or apertures 42b, any one of which may be engaged selectively by a finger or pawl 44b formed on the diaphragm setting ring 18, this finger being rigid in this instance, instead of flexible or resilient.

A central pin or axle 56 extends through the setting knob 26 and its pinion 30, and is axially slidable therein. At its rear end this pin carries a disk or flange 58 which bears against the front face of the ring 16. When it is desired to adjust the integrated exposure value (that is, to change the relative positions of the rings 16 and 18) rearward pressure is exerted on the projecting forward end of the pin or axle 56, which thus forces the disk 16 rearwardly against the force of the corrugated spring 54, to a sufficient distance so that the disk lies behind the rear end of the rigid pawl 44b. Thus one of the two disks 16 and 18 may be turned relative to the other, by holding one of the setting knobs and turning the other of the setting knobs, just as before. When the adjustment is completed, the rearward pressure on the pin 56 is released, whereupon the spring 54 will restore the disk 16 forwardly so that the pawl 44b becomes seated in the appropriate one of the recesses 42b. Although the pawl 44b is not a resilient pawl in this instance, yet the coupling between the two disks or rings 16 and 18 may still be described as a resilient or elastic coupling, since the coupling is held in effective position by means of the spring 54 and is released or disengaged by flexing this resilient spring 54.

Figure 9:
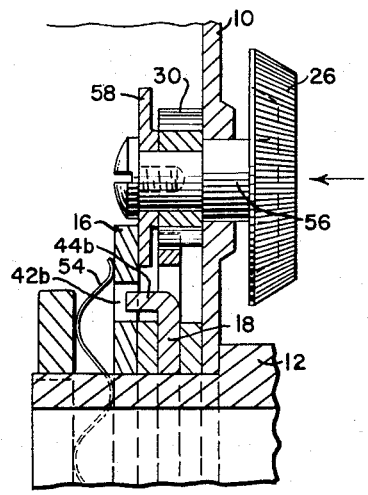
Fig. 9 is a view similar to Fig. 8 showing another modification.

Another variation of the coupling means is illustrated in Fig. 9. The lens tube 12, the adjusting rings 16 and 18, the apertures or recesses 42b, and the rigid pawl 44b, together with the corrugated spring 54, are the same as in Fig. 8. But instead of using a pin 56 movable axially through the setting knob 26, as was done in Fig. 8, the entire setting knob 26 and its shaft 56 are together movable axially, in this alternative construction shown in Fig. 9. The pinion 30 is made with a wider face, so that it will mesh with the peripheral gear teeth on the ring 18 in all axial positions of the knob 26 and shaft 56. The disk 58 on the rear end of the shaft lies against the front face of the ring 16, so that the force of the spring 54 normally holds the disk 58, shaft 56, and knob 26 at the extreme forward limit of their axial motion, with the knob 26 spaced somewhat forwardly from the wall 10. When the integrated exposure value is to be adjusted, rearward pressure is exerted against the entire knob 26, the rearward movement being transmitted through the disk 58 to the ring 16, moving the ring rearwardly against the action of the spring 54, thus disengaging the recess 42b from the coupling pawl 44b, enabling one of the rings 16 and 18 to be turned relative to the other.

With reference to each of the integrated exposure value scale arrangements shown in Figs. 1, 5 and 7, it may be said that the exposure value scale on one of the rings is read in conjunction with an index placed on the other ring. In Fig. 7, the index is the mark 52. In Figs. 1 and 5, there is no physical index mark as such, but the window 48 or 48a functions as an index to enable the reading of the proper graduation of the exposure scale, and so the window 48 or 48a may be referred to broadly as an index.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera comprising a casing for containing an objective shutter, a lens tube located at least partly within said casing, a shutter speed adjusting ring and a diaphragm aperture adjusting ring both rotatable circumferentially on said lens tube within said casing, each of said rings having gear teeth on part of its periphery, a first rotatable adjusting knob rotatable about an axis substantially parallel to the axis of said tube and projecting forwardly from and accessible at the front of said casing, a pinion operatively connected to and coaxial with said first knob and meshing with said gear teeth on said speed adjusting ring for constantly connecting said first knob to said speed adjusting ring to turn said speed adjusting ring upon turning said first knob, a second rotatable adjusting knob also rotatable about an axis substantially parallel to the axis of said tube and projecting forwardly from and accessible at the front of said casing, a pinion operatively connected to and coaxial with said second knob and meshing with said gear teeth on said aperture adjusting ring for constantly connecting said second knob to said aperture adjusting ring to turn said aperture adjusting ring upon turning said second knob, a series of recesses in one of said rings arranged in an arc concentric with the axis of rotation of such ring, a projection on the other of said rings resiliently urged into any selected one of said recesses for coupling said speed adjusting ring and said aperture adjusting ring to each other in various angular positions relative to each other, so that when said two rings are effectively coupled to each other, rotation of either one of said knobs will serve to turn both of said rings simultaneously, at least a portion of one of said rings in the vicinity of said recesses and said projection being capable of limited movement away from the other of said rings in a direction axially of said tube, spring means acting on one of said adjusting rings to urge it in a direction axially of said lens tube and toward the other of said adjusting rings to tend to keep said projection on one ring seated in one of the recesses of the other ring, and means coaxial with one of said adjusting knobs and movable axially of said one of said adjusting knobs for displacing said one of said adjusting rings axially away from the other of said adjusting rings against the force of said spring means, to uncouple the two adjusting rings from each other to permit independent rotation of one relative to the other.

2. A construction as defined in claim 1, in which said coaxial means movable axially with one of said knobs includes means mounting the knob itself for axial movement, and a part movable axially with the knob for engaging the adjusting ring to displace it axially.

3. A construction as defined in claim 1, in which said coaxial means movable axially with one of said knobs includes a shaft passing axially through the knob and movable axially with respect to the knob, and a part carried by and movable axially with said shaft for engaging the adjusting ring to displace it axially.

4. A photographic camera adjusting assembly including a first ring and a second ring, means for supporting said rings for concentric rotation about a common axis of rotation, one of said rings being rotatable in accordance with adjustment of shutter speed and the other of said rings being rotatable in accordance with adjustment of diaphragm aperture, a series of recesses formed in one of said rings and arranged in an arc concentric with said axis of rotation, a projection on the other of said rings for engaging in any selected one of said recesses, at least a portion of one of said rings being movable axially away from the other of said rings to enable said projection to be disengaged from the selected recess, spring means urging said two rings toward each other in a direction parallel to said axis to tend to keep said projection resiliently seated in one of said recesses to couple the two rings to each other for conjoint rotation, a first adjusting knob and a second adjusting knob each mounted for rotation, gearing operatively connecting said first adjusting knob to said first ring to turn the same, gearing operatively connecting said second adjusting knob to said second ring to turn the same, means movable in the direction of the axis of rotation of one of said knobs for moving one of said rings axially away from the other of said rings against the force of said spring means to remove said projection from the recess in which it was seated so that one ring may be turned independently of the other ring, and scale means moving with said rings for indicating visually the relative positions of orientation of the two rings with respect to each other.

5. A coupling arrangement for adjustably coupling a diaphragm aperture adjusting member of a photographic shutter to a speed adjusting member of each shutter, said arrangement comprising a tubular member defining an exposure opening, a diaphragm aperture adjusting member and a shutter speed adjusting member both mounted on the exterior of said tubular member for concentric rotation thereon, both of said adjusting members being mainly of flat disk-like form and lying adjacent each other, one of said adjusting members having limited axial movement on said tubular member, a tongue on one of said adjusting members, a circumferentially arranged series of openings in the other of said adjusting members for selectively receiving said tongue in one or another of said openings to couple the two adjusting members to each other for conjoint rotation in a selected one of a plurality of positions of relative orientation with respect to each other, a spring tending to move the axially movable one of said adjusting members toward the other of said adjusting members to maintain said tongue in coupling relation in one of said openings, a rotary setting knob gearingly connected to one of said adjusting members to turn it upon rotation of said setting knob, and means including a disengaging member concentric with said setting knob for separating said two adjusting members axially from each other to disengage the driving connection between said tongue and the adjusting member which has said openings.

References Cited in the file of this patent

UNITED STATES PATENTS

| 1,543,208 | Fairchild | June 23, 1925 |
| 1,623,998 | Cooke | Apr. 12, 1927 |
| 2,241,020 | Nerwin | May 6, 1941 |
| 2,342,819 | Priesemann | Feb. 29, 1944 |
| 2,509,385 | Ziaylek | May 30, 1950 |
| 2,596,328 | Dorsey | May 13, 1952 |

FOREIGN PATENTS

| 7,787 | Great Britain | of 1914 A.D. |
| 303,088 | Germany | Aug. 25, 1916 |
| 519,590 | Germany | Mar. 7, 1931 |
| 586,844 | Germany | Oct. 26, 1933 |
| 666,365 | Germany | Oct. 18, 1938 |
| 1,028,877 | France | Mar. 4, 1953 |